United States Patent
Inoue

(10) Patent No.: US 11,509,405 B2
(45) Date of Patent: Nov. 22, 2022

(54) MOBILE TERMINAL TESTING APPARATUS, MOBILE TERMINAL TESTING SYSTEM, AND CONTROL METHOD FOR MOBILE TERMINAL TESTING APPARATUS

(71) Applicant: ANRITSU CORPORATION, Kanagawa (JP)

(72) Inventor: Naoki Inoue, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 24 days.

(21) Appl. No.: 17/178,611

(22) Filed: Feb. 18, 2021

(65) Prior Publication Data

US 2021/0266080 A1  Aug. 26, 2021

(30) Foreign Application Priority Data

Feb. 26, 2020  (JP) .............................. JP2020-030568

(51) Int. Cl.
*H04L 12/26* (2006.01)
*H04B 17/15* (2015.01)

(52) U.S. Cl.
CPC .................................... *H04B 17/15* (2015.01)

(58) Field of Classification Search
CPC ....................................................... H04B 17/15
See application file for complete search history.

(56) References Cited

U.S. PATENT DOCUMENTS

| 8,824,588 | B2 * | 9/2014 | Emmanuel | H04B 17/10 455/66.1 |
| 10,666,542 | B1 * | 5/2020 | Olgaard | H04B 17/29 |
| 10,992,330 | B2 * | 4/2021 | Abdelmonem | H04W 28/0236 |
| 11,275,104 | B2 * | 3/2022 | Yaguchi | G06F 3/0659 |
| 11,428,734 | * | 8/2022 | Sun | G01R 31/2887 |
| 2012/0231744 | A1 * | 9/2012 | Gregg | H04B 17/309 455/67.12 |
| 2016/0301588 | A1 * | 10/2016 | Olgaard | H04L 43/50 |
| 2020/0393509 | A1 * | 12/2020 | Kim | G01R 31/31924 |
| 2021/0080523 | A1 * | 3/2021 | Derat | G01R 33/288 |

FOREIGN PATENT DOCUMENTS

JP  3708458 B2  10/2005

* cited by examiner

*Primary Examiner* — Guang W Li
(74) *Attorney, Agent, or Firm* — Pearne & Gordon LLP

(57) ABSTRACT

A test control unit controls a mobile terminal such that a first period T1, T3, T5, and T7 in which power of a transmission signal is maintained constant, and a second period T2, T4, T6, and T8 in which the power of the transmission signal is changed stepwise are alternately and continuously repeated, and changes a maximum value of signal power that is receivable by a pseudo base station unit in each first period T1, T3, T5, and T7, according to a power range of the transmission signal to be changed in each second period T2, T4, T6, and T8. A minimum value of the signal power that is receivable by the pseudo base station unit is determined, according to a maximum value of the signal power that is receivable by the pseudo base station unit and a reception dynamic range of a mobile terminal testing apparatus.

6 Claims, 5 Drawing Sheets

MOBILE TERMINAL TESTING APPARATUS, MOBILE TERMINAL TESTING SYSTEM, AND CONTROL METHOD FOR MOBILE TERMINAL TESTING APPARATUS

TECHNICAL FIELD

The present invention relates to a mobile terminal testing apparatus, a mobile terminal testing system, and a control method for a mobile terminal testing apparatus.

BACKGROUND ART

Patent Document 1 discloses, for example, a mobile terminal testing apparatus in the related art, including power control setting means for setting, for a mobile terminal, a number of transmission power changes and an amount of change in transmission power to be requested for transmission to a mobile terminal to be measured; power control requesting means for requesting the number of transmission power changes and the amount of change in transmission power set by the power control setting means for the mobile terminal; transmission means for, when receiving a transmission request from the power control requesting means, transmitting the transmission power that controlled by bit information on TPC in each transmission slot to either up/down or maintaining the status to the mobile terminal; receiving means for receiving transmission power transmitted from the mobile terminal in response to transmission from the transmission means accompanying the transmission request by the power control requesting means; slot detection means for detecting a slot of the mobile terminal, based on an output signal of the receiving means; slot power detection means for detecting power of each slot detected by the slot detection means and the amount of power change between slots; an analysis result memory that stores the number of slots, the power of each slot, and the amount of power change between the slots, detected by the slot detection means and the slot power detection means; determination means for comparing the information stored in the analysis result memory with the setting information of the power control setting means, and when the number of slots matches, comparing the powers of slots and the amount of change in power between slots to perform an operation determination of the mobile terminal; and determination result output means for outputting an operation determination result of the determination means.

RELATED ART DOCUMENT

[Patent Document]
[Patent Document 1] Japanese Patent No. 3708458

DISCLOSURE OF THE INVENTION

Problem that the Invention is to Solve

However, in the mobile terminal testing apparatus in the related art as described above, the power of the signal received from the mobile terminal to the mobile terminal testing apparatus deviates from the reception range of the mobile terminal testing apparatus, depending on the number of transmission power changes and the amount of transmission power change. Thus, there is a problem in the related art that it is not possible to perform a test of changing the transmission power of a mobile terminal over a wide range.

The present invention has been made to solve such a problem, and an object of the present invention is to provide a mobile terminal testing apparatus, a mobile terminal testing system, and a control method for a mobile terminal testing apparatus capable of performing a test for changing the transmission power of a mobile terminal over a wide range.

Means for Solving the Problem

A mobile terminal testing apparatus of the present invention is a mobile terminal testing apparatus (1) that tests power of a transmission signal transmitted by a mobile terminal (2), the apparatus including: a pseudo base station unit (10) that functions as a base station for the mobile terminal; and a test control unit (13) that controls the pseudo base station unit, in which the test control unit controls the pseudo base station unit such that a first period in which the power of the transmission signal is maintained constant, and a second period in which the power of the transmission signal is changed stepwise are alternately and continuously repeated, and changes a maximum value of signal power that is receivable by the pseudo base station unit, in the first period before the second period, according to a power range of the transmission signal to be changed in the second period, and a minimum value of the signal power that is receivable by the pseudo base station unit is determined, according to the maximum value of the signal power that is receivable by the pseudo base station unit, and a reception dynamic range of the mobile terminal testing apparatus.

With this configuration, in the mobile terminal testing apparatus of the present invention, the pseudo base station unit is controlled such that a first period in which the power of the transmission signal of the mobile terminal is maintained constant, and a second period in which the power of the transmission signal of the mobile terminal is changed stepwise are alternately and continuously repeated, a maximum value of signal power that is receivable by the pseudo base station unit is changed according to a power range of the transmission signal to be changed in the second period, in the first period before the second period, and a minimum value of the signal power that is receivable by the pseudo base station unit is determined according to the maximum value of the signal power that is receivable by the pseudo base station unit, and the reception dynamic range of the mobile terminal testing apparatus, so that it is possible to perform a test in which the transmission power of the mobile terminal is changed over a wide range.

The mobile terminal testing apparatus of the present invention includes a display unit (14) that displays a test result of the power of the transmission signal, in which the test control unit may be configured to cause the display unit to display information in which the power of the transmission signals corresponding to the second period is arranged in chronological order, as the test result of the power of the transmission signal.

With this configuration, the mobile terminal testing apparatus of the present invention does not cause the display unit to display information indicating the power of the transmission signal of the mobile terminal corresponding to the first period, which is unnecessary as the test result, so that the visibility of the test result can be improved.

Further, the mobile terminal testing apparatus of the present invention includes a test information storage unit (11) that stores an upper limit of the number of times that the power of the transmission signal is changed, and when the number of times that the power of the transmission signal is changed reaches the upper limit, in the second period, the test control unit may be configured to shift a measurement period from the second period to the first period.

With this configuration, the mobile terminal testing apparatus of the present invention can suppress an excessive change of the power of the transmission signal of the mobile terminal.

A mobile terminal testing system of the present invention includes a mobile terminal testing apparatus (1) that tests power of a transmission signal transmitted by a mobile terminal (2); and a test control apparatus (4) that controls the mobile terminal testing apparatus, in which the mobile terminal testing apparatus has a pseudo base station unit (10) that functions as a base station for the mobile terminal, and the test control apparatus has a test control unit (13) that controls the pseudo base station unit, in which the test control unit controls the pseudo base station unit such that a first period in which the power of the transmission signal is maintained constant, and a second period in which the power of the transmission signal is changed stepwise are alternately and continuously repeated, and changes a maximum value of signal power that is receivable by the pseudo base station unit, in the first period before the second period, according to a power range of the transmission signal to be changed in the second period, and a minimum value of the signal power that is receivable by the pseudo base station unit is determined, according to the maximum value of the signal power that is receivable by the pseudo base station unit, and a reception dynamic range of the mobile terminal testing apparatus.

With this configuration, in the mobile terminal testing system of the present invention, the pseudo base station unit is controlled such that a first period in which the power of the transmission signal of the mobile terminal is maintained constant, and a second period in which the power of the transmission signal of the mobile terminal is changed stepwise are alternately and continuously repeated, a maximum value of signal power that is receivable by the pseudo base station unit is changed according to a power range of the transmission signal to be changed in the second period, in the first period before the second period, and a minimum value of the signal power that is receivable by the pseudo base station unit is determined according to the maximum value of the signal power that is receivable by the pseudo base station unit, and the reception dynamic range of the mobile terminal testing apparatus, so that it is possible to perform a test in which the transmission power of the mobile terminal is changed over a wide range.

A control method for a mobile terminal testing apparatus of the present invention is a control method for a mobile terminal testing apparatus (1) including a pseudo base station unit (10) that functions as a base station for a mobile terminal (2), and a test control unit (13) that controls the pseudo base station unit, and testing power of a transmission signal transmitted by the mobile terminal, the control method causing the pseudo base station unit to execute, under control of the test control unit, a power control step of controlling the mobile terminal such that a first period in which the power of the transmission signal is maintained constant, and a second period in which the power of the transmission signal is changed stepwise are alternately and continuously repeated; and a range change step of changing a maximum value of signal power that is receivable by the pseudo base station unit, according to a power range of the transmission signal to be changed in the second period, in the first period before the second period, and a minimum value of the signal power that is receivable by the pseudo base station unit is determined, according to the maximum value of the signal power that is receivable by the pseudo base station unit, and a reception dynamic range of the mobile terminal testing apparatus.

As described above, in the control method for the mobile terminal testing apparatus of the present invention, the pseudo base station unit is controlled such that a first period in which the power of the transmission signal of the mobile terminal is maintained constant, and a second period in which the power of the transmission signal of the mobile terminal is changed stepwise are alternately and continuously repeated, a maximum value of signal power that is receivable by the pseudo base station unit is changed according to a power range of the transmission signal to be changed in the second period, in the first period before the second period, and a minimum value of the signal power that is receivable by the pseudo base station unit is determined according to the maximum value of the signal power that is receivable by the pseudo base station unit, and the reception dynamic range of the mobile terminal testing apparatus, so that it is possible to perform a test in which the transmission power of the mobile terminal is changed over a wide range.

Advantage of the Invention

The present invention can provide a mobile terminal testing apparatus, a mobile terminal testing system, and a control method for a mobile terminal testing apparatus capable of performing a test for changing the transmission power of a mobile terminal over a wide range.

BEST MODE FOR CARRYING OUT THE INVENTION

Embodiments of the present invention will be described below with reference to the drawings. In the embodiment of the present invention, an example will be described in which the mobile terminal testing apparatus according to the present invention is applied to a mobile terminal testing apparatus for testing a mobile terminal conforming to the standard specifications of 5G New Radio (NR) which is a 5th Generation (5G) wireless system.

Figure 1:
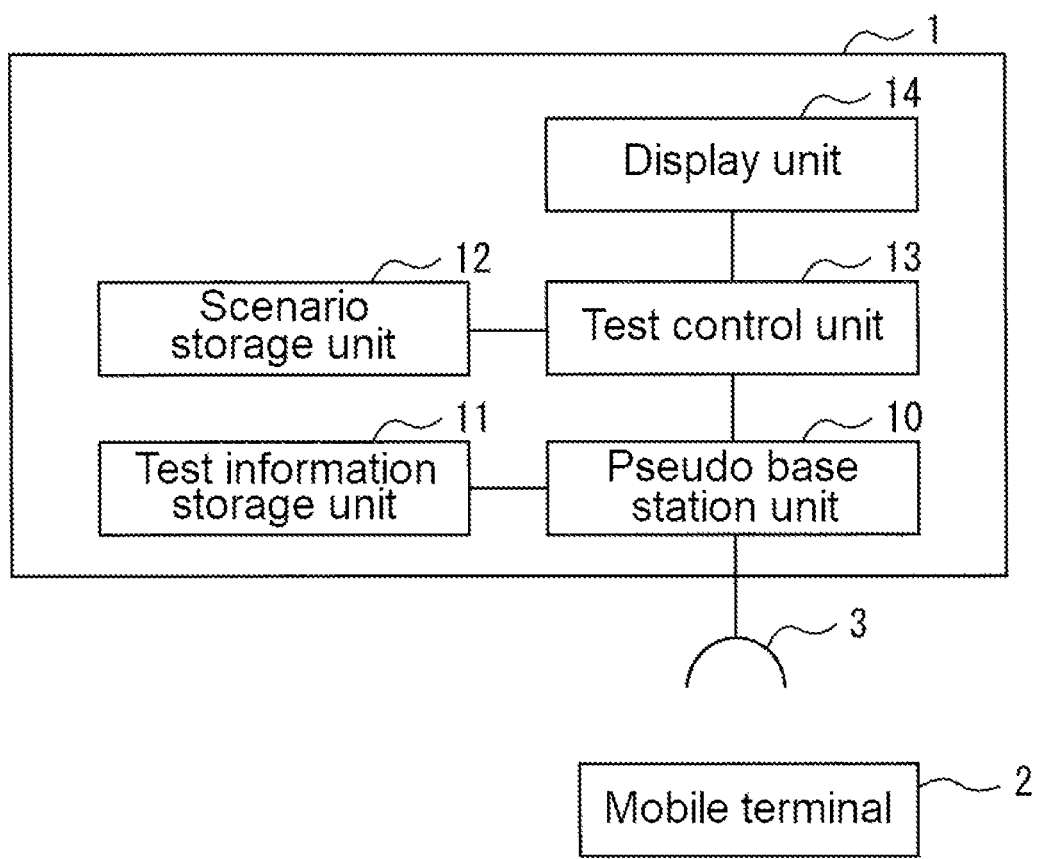
FIG. 1 is a block diagram of a mobile terminal testing apparatus according to an embodiment of the present invention.

As shown in FIG. 1, a mobile terminal testing apparatus 1 wirelessly transmits and receives signals to and from a mobile terminal 2 via an antenna 3. Further, the mobile terminal testing apparatus 1 can transmit and receive signals to and from the mobile terminal 2 by wire via a coaxial cable or the like.

The mobile terminal testing apparatus 1 includes a pseudo base station unit 10 that functions as a base station of the mobile terminal, a test information storage unit 11 that stores test information including parameters for controlling the pseudo base station unit 10, a scenario storage unit 12 which stores information including a scenario for testing a mobile terminal 2, a test control unit 13 that controls the pseudo base station unit 10, based on the information stored in the scenario storage unit 12, and a display unit 14 that displays test results of the mobile terminal 2, and the like.

Here, the mobile terminal testing apparatus 1 is a computer device (not shown) provided with a communication circuit for communicating with the mobile terminal 2. The computer device includes a central processing unit (CPU), a read only memory (ROM), a random access memory (RAM), a hard disk device, an input/output port, and a touch panel, which are not shown.

A program for making a computer device function as a mobile terminal testing apparatus 1 is stored in a ROM and a hard disk device of the computer device. That is, the CPU executes the program stored in the ROM with the RAM as a work area, and the computer device functions as the mobile terminal testing apparatus 1.

The pseudo base station unit 10 includes a CPU and a communication circuit. The test information storage unit and the scenario storage unit 12 is a RAM or a hard disk device. The test control unit 13 is a CPU.

The display unit 14 is a liquid crystal display device that constitutes a touch panel. The touch panel includes a liquid crystal display device and a touch pad. Through this touch pad, the test control unit 13 is subjected to test selection, test execution instruction, test parameter setting, test result display adjustment, and the like.

In the present embodiment, an example of causing the mobile terminal testing apparatus 1 to execute a transmission power measurement test according to the Power Control Relative power tolerance specified in 3GPP TS 38.521-1 will be described.

In 5G NR, a mobile terminal transmits an uplink signal to a base station by using a resource block consisting of a combination of one subframe obtained by dividing a radio frame into 10 and 12 consecutive subcarriers as a transmission unit.

In the transmission power measurement test, it is tested whether the power of the uplink signal received by the base station falls within a specified range, after the base station switches the resource block that is used for the mobile terminal to transmit the uplink signal. In the following description, the base station's switching the resource block for causing the mobile terminal to transmit an uplink signal is also referred to as "resource block change".

For example, in the transmission power measurement test, the mobile terminal 2 is controlled by the mobile terminal testing apparatus 1 such that the power of the uplink signal (hereinafter, also referred to as "transmission signal") transmitted by the mobile terminal 2 changes stepwise by a predetermined amount (for example, dB) for each subframe, the power of the transmission signal changes more than a predetermined amount (for example, 7.99 dB) at the start of a predetermined subframe to perform a resource block change, and then changes stepwise by a predetermined amount (for example, 1 dB) for each subframe.

When executing the transmission power measurement test, the test control unit 13 causes the pseudo base station unit 10 to transmit a Transmission Power Control (TPC) command for controlling the transmission power, thereby controlling the power of the transmission signal of the mobile terminal 2.

In the test information storage unit 11, the number of measurement subframes in the transmission power measurement test, a predetermined amount that is the amount of change in the power of the transmission signal of the mobile terminal 2, the subframe for performing the resource block change, the amount of change at the time of the resource block change, an upper limit of the number of times the power of the transmission signal of the mobile terminal 2 is changed based on the maximum value of the dynamic range of the mobile terminal testing apparatus 1, and the like are stored in advance as test parameters. These test parameters can be changed via the test control unit 13 using a touch panel or the like.

In such a transmission power measurement test, the power of the transmission signal of the mobile terminal 2 may deviate from the reception range of the pseudo base station unit 10, depending on the amount of change in the power of the transmission signal of the mobile terminal 2, particularly the amount of change at the time of resource block change.

Therefore, the test control unit 13 changes the maximum value of the signal power that is receivable by the pseudo base station unit 10 during the transmission power measurement test. By changing the maximum value of the signal power that is receivable by the pseudo base station unit 10, the minimum value of the signal power that is receivable by the pseudo base station unit 10 is determined according to the maximum value of the signal power that is receivable by the pseudo base station unit 10 and the reception dynamic range of the mobile terminal testing apparatus 1. Specifically, the maximum value of receivable signal power is adjusted by adjusting an attenuator provided inside the pseudo base station unit 10. The reception dynamic range of the mobile terminal testing apparatus 1 is determined by the configuration of the hardware of the mobile terminal testing apparatus 1, and can be adjusted to an optimum value by the software, when the hardware is changed.

Figure 2:
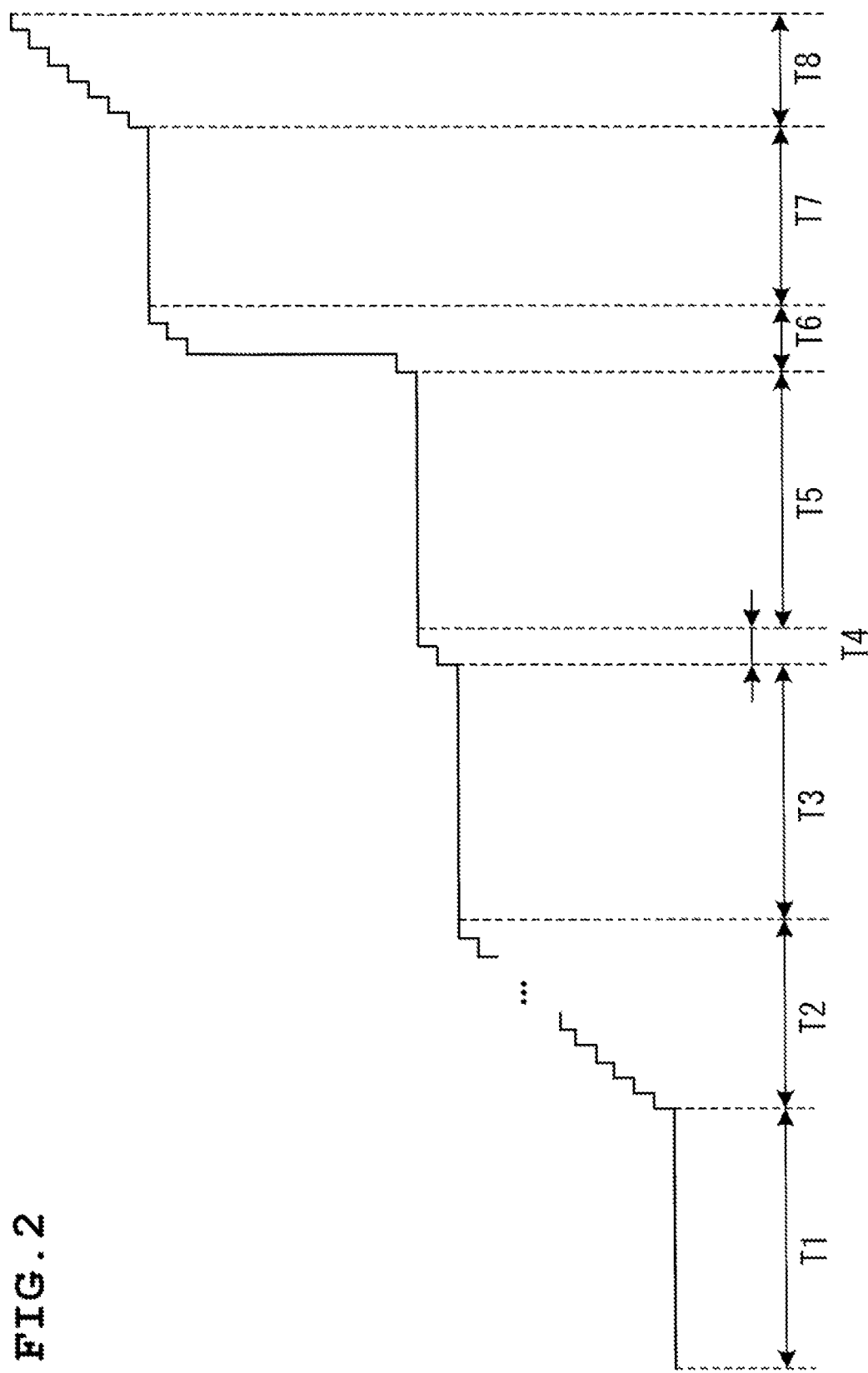
FIG. 2 is a graph for explaining control of power of a transmission signal of a mobile terminal by a mobile terminal testing apparatus according to an embodiment of the present invention.

For example, as shown in FIG. 2, the test control unit 13 controls the pseudo base station unit 10 such that a first period T1, T3, T5, and T7, in which the power of the transmission signal of the mobile terminal 2 is maintained constant, and a second period T2, T4, T6, and T8, in which the power of the transmission signal of the mobile terminal 2 is changed stepwise, are alternately and continuously repeated.

The test control unit 13 changes the maximum value of the signal power that is receivable by the pseudo base station unit 10 in each of the first periods T1, T3, T5, and T7, according to the power range of the transmission signal to be changed in each of the second periods T2, T4, T6, and T8.

Further, the test control unit 13 may not change the maximum value of the signal power that is receivable by the pseudo base station unit 10 in each of the first periods T1, T3, T5, and T7, according to the range of the power of the transmission signal to be changed in each of the second periods T2, T4, T6, and T8. The lengths of the first period T1, T3, T5, and T7 may be the same as or different from each other as long as the lengths are multiples of the frame length.

In the first period T1, the test control unit 13 controls the pseudo base station unit 10 to maintain the power of the transmission signal of the mobile terminal 2 at the initial value, to secure a time to change the maximum value of the signal power that is receivable by the pseudo base station unit 10, according to the range of the power of the transmission signal to be changed in the second period T2.

In the second period T2, the test control unit 13 controls the pseudo base station unit 10 so as to change stepwise the power of the transmission signal of the mobile terminal 2. However, in the second period T2, since the number of times the power of the transmission signal of the mobile terminal 2 is changed stepwise exceeds the upper limit (for example, 30) stored in the test information storage unit 11, the test control unit 13 shifts the measurement period from the second period T2 to the first period T3 before the number of times the power of the transmission signal of the mobile terminal 2 is changed stepwise exceeds the upper limit.

In the second period T4, the test control unit 13 changes stepwise the power of the transmission signal of the mobile terminal 2 by the number of times that the power of the transmission signal of the mobile terminal 2 cannot be changed stepwise in the second period T2.

The second period T2 and T4 are measurement periods before the resource block change is performed. The second period T6 is a measurement period for performing a resource block change. The second period T8 is a measurement period after the resource block change is performed.

In the second period T4, T6, and T8, since the number of times the power of the transmission signal of the mobile terminal 2 is changed stepwise does not exceed the upper limit stored in the test information storage unit 11, the test control unit 13 does not set the measurement period to the first period when the power of the transmission signal of the mobile terminal 2 is changed stepwise.

The pseudo base station unit 10 receives the transmission signal transmitted from the mobile terminal 2 in response to the control of the power of the transmission signal described above, and outputs information indicating the power of the received transmission signal to the test control unit 13. The test control unit 13 causes the display unit 14 to display information in which the power of the transmission signals is arranged in chronological order, as the test result of the transmission power measurement test.

Figure 3:
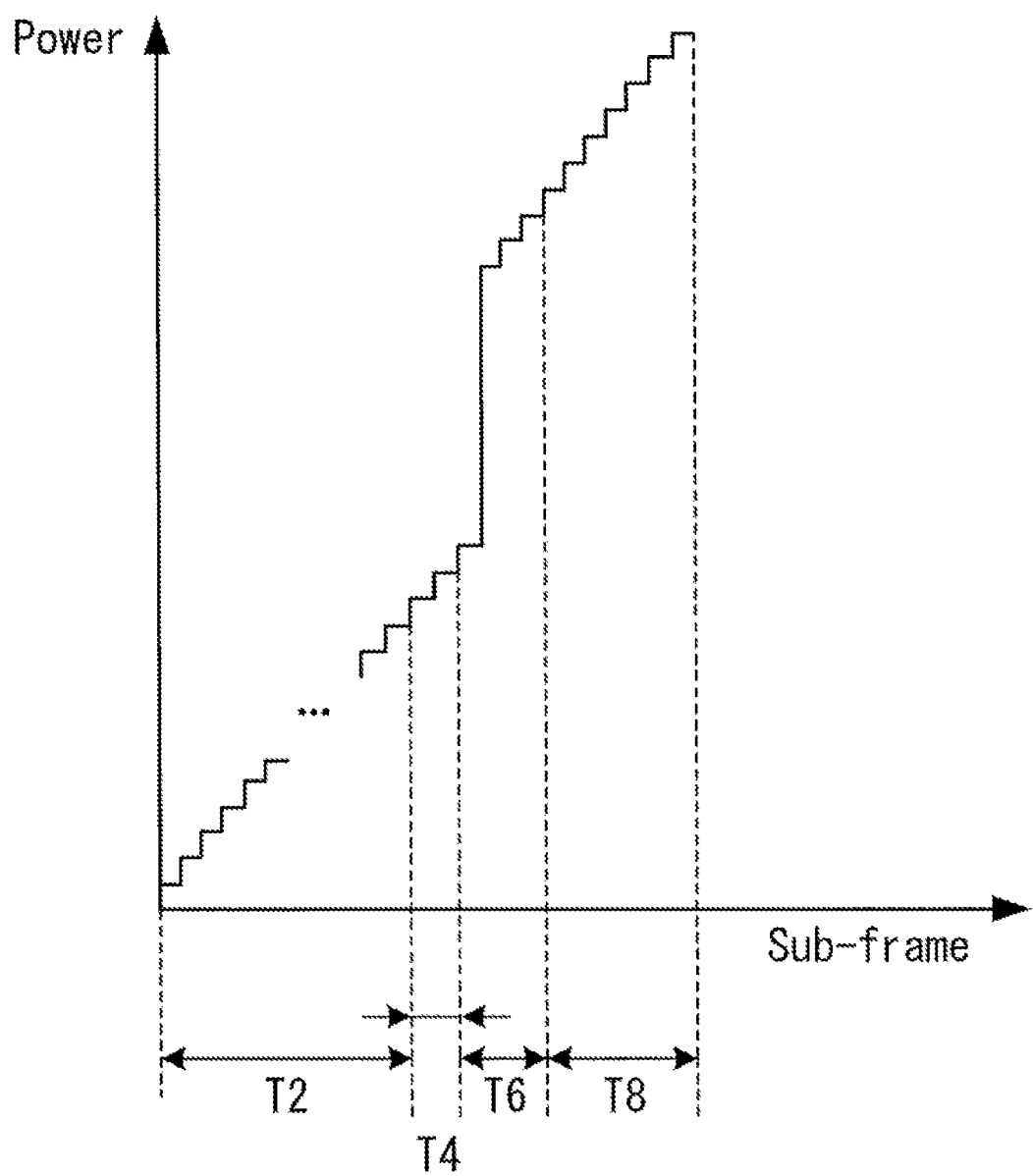
FIG. 3 is a diagram showing a display example of a test result of a transmission power measurement test of a mobile terminal testing apparatus according to an embodiment of the present invention.

For example, as shown in FIG. 3, the test control unit 13 causes the display unit 14 to display information in which the power of the transmission signals corresponding to the second period T2, T4, T6, and T8 is arranged in chronological order. As described above, the test control unit 13 does not cause the display unit 14 to display the information indicating the power of the transmission signal corresponding to the first period T1, T3, T5, and T7.

As shown in FIG. 3, the test control unit 13 may be able to select the test mode in which the display unit 14 does not display information indicating the power of the transmission signal corresponding to the first period T1, T3, T5, and T7 and the debug mode in which the display unit 14 displays information indicating the power of the transmission signal corresponding to the first period T1, T3, T5, and T7, via the touch panel.

Figure 4:
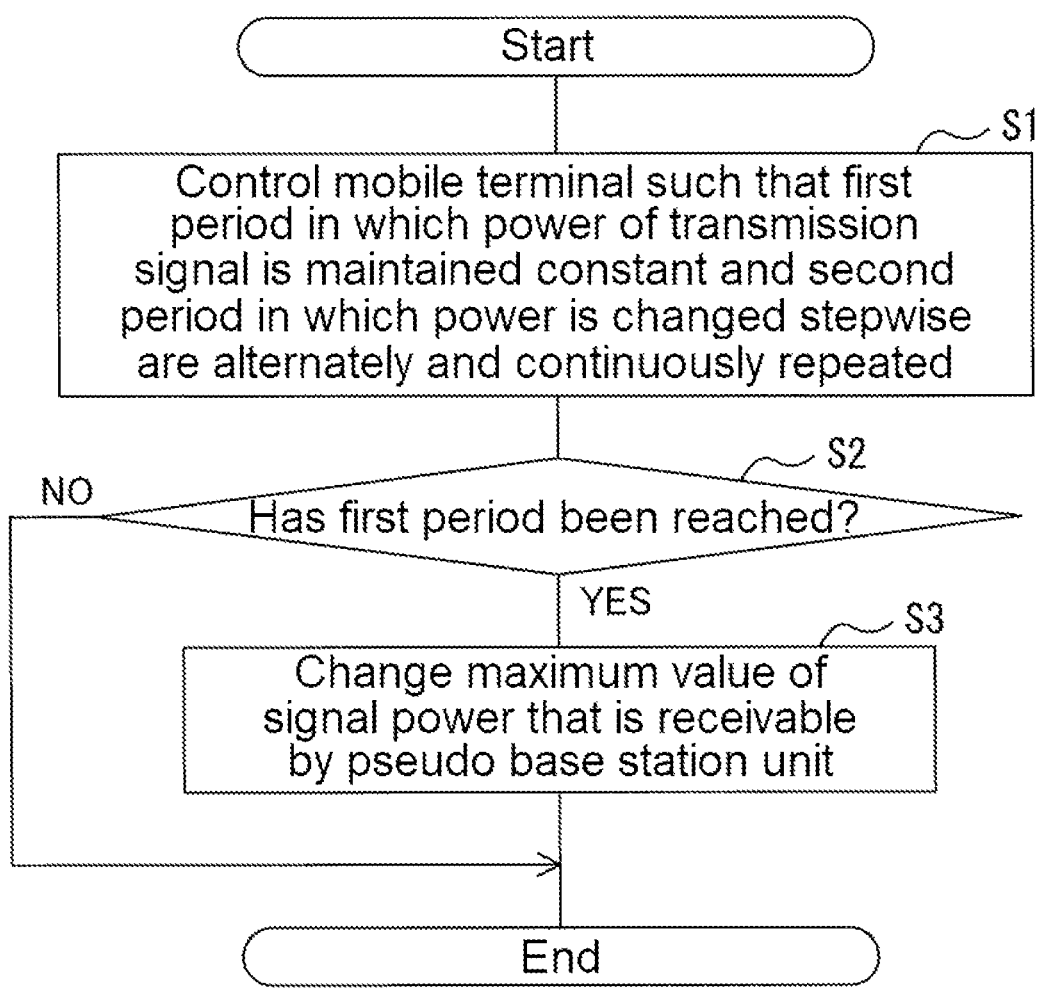
FIG. 4 is a flowchart showing a transmission power measurement test operation of the mobile terminal testing apparatus according to the embodiment of the present invention.

The transmission power measurement test operation of the mobile terminal testing apparatus 1 according to the embodiment of the present invention configured as described above will be described with reference to FIG. 4. The transmission power measurement test operation described below is repeatedly executed by the pseudo base station unit 10 controlled by the test control unit 13 over the execution period of the transmission power measurement test.

First, the pseudo base station unit 10 controls the mobile terminal 2 such that a first period in which the power of the transmission signal of the mobile terminal 2 is maintained constant, and a second period in which the power of the transmission signal of the mobile terminal 2 is changed stepwise are alternately and continuously repeated (step S1: power control step).

Next, the pseudo base station unit 10 determines whether the first period has been reached (step S2). When it is determined that the first period has not been reached, the pseudo base station unit 10 ends the transmission power measurement test operation.

On the other hand, when it is determined that the first period has been reached, the pseudo base station unit 10 changes the maximum value of the receivable power of the signal, according to the power range of the transmission signal of the mobile terminal 2 to be changed in the second period. (step S3: range change step).

The minimum value of the signal power that is receivable by the pseudo base station unit 10 is determined, according to the maximum value of the receivable power of the signal, and the reception dynamic range of the mobile terminal testing apparatus 1. After executing the process of step S3, the pseudo base station unit 10 ends the transmission power measurement test operation.

As described above, in the present embodiment, the pseudo base station unit 10 is controlled such that a first period T1, T3, T5, T7 in which the power of the transmission signal of the mobile terminal 2 is maintained constant, and a second period T2, T4, T6, T8 in which the power of the transmission signal of the mobile terminal 2 is changed stepwise are alternately and continuously repeated, a maximum value of signal power that is receivable by the pseudo base station unit 10 in each first period T1, T3, T5, T7 is changed according to a power range of the transmission signal of the mobile terminal 2 to be changed in each second period T2, T4, T6, T8, and the minimum value of the signal power that is receivable by the pseudo base station unit 10 is determined according to the maximum value of the signal power that is receivable by the pseudo base station unit 10 and the reception dynamic range of the mobile terminal testing apparatus 1, so that it is possible to perform a test in which the transmission power of the mobile terminal 2 is changed over a wide range. In other words, a test for changing the transmission power of the mobile terminal 2 can be performed over a wider range than the reception dynamic range of the mobile terminal testing apparatus 1.

Further, in the present embodiment, the information in which the power of the transmission signal of the mobile terminal 2 corresponding to the second period is arranged in chronological order is displayed on the display unit 14, as the test result of the transmission power measurement test, and the information indicating the power of the transmission signal of the mobile terminal 2 corresponding to the first period, which is unnecessary as the test result of the transmission power measurement test, is not displayed on the display unit 14, so that the visibility of the test result of the transmission power measurement test can be improved.

Further, in the present embodiment, when the number of times the power of the transmission signal of the mobile terminal 2 is changed reaches the upper limit in the second period, the measurement period is shifted from the second period to the first period, so that it is possible to suppress an excessive change of the power of the transmission signal of the mobile terminal 2.

In the transmission power measurement test of the present embodiment, an example in which the power of the transmission signal of the mobile terminal 2 is increased stepwise has been described, but the transmission power measurement test includes test items to reduce stepwise the power of the transmission signal of the mobile terminal 2. The case where the power of the transmission signal of the mobile terminal 2 is reduced stepwise is the same as that of the present embodiment, and thus the illustration is omitted.

Further, the mobile terminal testing apparatus 1 in the present embodiment may be configured to connect a general-purpose computer device including a CPU, a RAM, a ROM, a flash memory, a hard disk device, and a communication module.

Figure 5:
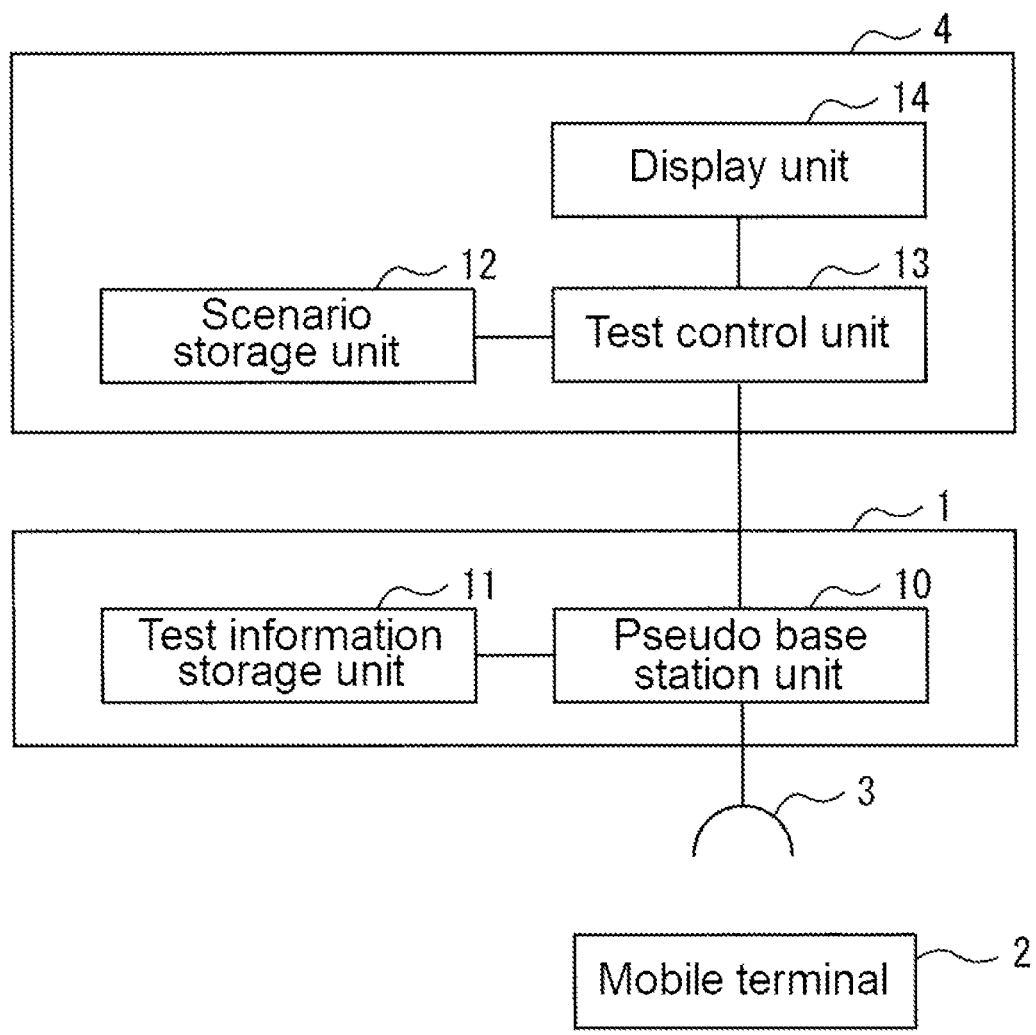
FIG. 5 is a block diagram of a mobile terminal testing system according to a modification example of the embodiment of the present invention.

In this case, as shown in FIG. 5, the test control apparatus 4 including the scenario storage unit 12, the test control unit 13, and the display unit 14 is configured by a general-purpose computer device, and the mobile terminal testing system may be configured by the mobile terminal testing apparatus 1 excluding the scenario storage unit 12, the test control unit 13, and the display unit 14, and the test control apparatus 4.

Although the embodiment of the present invention has been disclosed above, modifications may be made easily without departing from the scope of the invention. The embodiment of the present invention is disclosed on the premise that the equivalent with such modifications is included in the invention described in the claims.

DESCRIPTION OF REFERENCE NUMERALS AND SIGNS

1 Mobile terminal testing apparatus
2 Mobile terminal
4 Test control apparatus
10 Pseudo base station unit
11 Test information storage unit
13 Test control unit
14 Display unit

What is claimed is:

1. A mobile terminal testing apparatus that tests power of a transmission signal transmitted by a mobile terminal, the apparatus comprising:
 a pseudo base station unit that functions as a base station for the mobile terminal; and
 a test control unit that controls the pseudo base station unit, wherein
 the test control unit:
  controls the pseudo base station unit configured to provide a first period in which the power of the transmission signal is maintained constant, and a second period in which the power of the transmission signal is changed stepwise are alternately and continuously repeated, and
  changes a maximum value of signal power that is receivable by the pseudo base station unit, in the first period before the second period, according to a power range of the transmission signal to be changed in the second period, and
  a minimum value of the signal power that is receivable by the pseudo base station unit is determined, according to the maximum value of the signal power that is receivable by the pseudo base station unit, and a reception dynamic range of the mobile terminal testing apparatus.

2. The mobile terminal testing apparatus according to claim 1, further comprising:
 a display unit that displays a test result of the power of the transmission signal, wherein
 the test control unit causes the display unit to display information in which the power of the transmission signals corresponding to the second period is arranged in chronological order, as the test result of the power of the transmission signal.

3. The mobile terminal testing apparatus according to claim 2, further comprising:
 a test information storage unit that stores an upper limit of the number of times the power of the transmission signal is changed, wherein
 the test control unit shifts a measurement period from the second period to the first period, when the number of times the power of the transmission signal is changed reaches the upper limit, in the second period.

4. The mobile terminal testing apparatus according to claim 1, further comprising:
 a test information storage unit that stores an upper limit of the number of times the power of the transmission signal is changed, wherein
 the test control unit shifts a measurement period from the second period to the first period, when the number of times the power of the transmission signal is changed reaches the upper limit, in the second period.

5. A mobile terminal testing system comprising:
 a mobile terminal testing apparatus that tests power of a transmission signal transmitted by a mobile terminal; and
 a test control apparatus that controls the mobile terminal testing apparatus, wherein the mobile terminal testing apparatus has a pseudo base station unit that functions as a base station for the mobile terminal, and
 the test control apparatus has a test control unit that controls the pseudo base station unit,
 the test control unit controls the pseudo base station unit configured to provide a first period in which the power of the transmission signal is maintained constant, and a second period in which the power of the transmission signal is changed stepwise are alternately and continuously repeated, and changes a maximum value of signal power that is receivable by the pseudo base station unit, in the first period before the second period, according to a power range of the transmission signal to be changed in the second period, and
 a minimum value of the signal power that is receivable by the pseudo base station unit is determined, according to the maximum value of the signal power that is receivable by the pseudo base station unit, and a reception dynamic range of the mobile terminal testing apparatus.

6. A control method for a mobile terminal testing apparatus including a pseudo base station unit that functions as a base station for a mobile terminal, and a test control unit that controls the pseudo base station unit, and testing power of a transmission signal transmitted by the mobile terminal,
 the control method causing the pseudo base station unit to execute, under control of the test control unit,
 a power control step of controlling the mobile terminal configured to provide a first period in which the power of the transmission signal is maintained constant, and a second period in which the power of the transmission signal is changed stepwise are alternately and continuously repeated; and
 a range change step of changing a maximum value of signal power that is receivable by the pseudo base station unit, in the first period before the second period, according to a power range of the transmission signal to be changed in the second period, wherein
 a minimum value of the signal power that is receivable by the pseudo base station unit is determined, according to the maximum value of the signal power that is receivable by the pseudo base station unit, and a reception dynamic range of the mobile terminal testing apparatus.

* * * * *